(12) United States Patent
Liu et al.

(10) Patent No.: US 10,899,918 B2
(45) Date of Patent: Jan. 26, 2021

(54) HYDROLYSIS RESISTANT VINYL ESTER CONTAINING LATEXES

(71) Applicant: Arkema Inc., King of Prussia, PA (US)

(72) Inventors: Lily Liu, Oak Ridge, TN (US); Wayne Devonport, Apex, NC (US); Daniel E. Stark, Raleigh, NC (US); Matthew F. Boudreaux, Raleigh, NC (US)

(73) Assignee: Arkema Inc., King of Prussia, PA (US)

( * ) Notice: Subject to any disclaimer, the term of this patent is extended or adjusted under 35 U.S.C. 154(b) by 28 days.

(21) Appl. No.: 16/307,156

(22) PCT Filed: Jun. 19, 2017

(86) PCT No.: PCT/US2017/038124
§ 371 (c)(1),
(2) Date: Dec. 5, 2018

(87) PCT Pub. No.: WO2017/222979
PCT Pub. Date: Dec. 28, 2017

(65) Prior Publication Data
US 2019/0144658 A1 May 16, 2019

Related U.S. Application Data

(60) Provisional application No. 62/352,086, filed on Jun. 20, 2016.

(51) Int. Cl.
| | | |
|---|---|---|
| C08L 31/04 | (2006.01) | |
| C08F 285/00 | (2006.01) | |
| C08F 263/04 | (2006.01) | |
| C09D 5/03 | (2006.01) | |
| C09D 131/04 | (2006.01) | |
| C09J 9/00 | (2006.01) | |
| C09J 131/04 | (2006.01) | |

(52) U.S. Cl.
CPC ............ *C08L 31/04* (2013.01); *C08F 263/04* (2013.01); *C08F 285/00* (2013.01); *C09D 5/031* (2013.01); *C09D 131/04* (2013.01); *C09J 9/00* (2013.01); *C09J 131/04* (2013.01); C08L 2207/53 (2013.01)

(58) Field of Classification Search
CPC .... C08F 263/04; C08F 285/00; C08F 265/04; C08F 265/06; C08L 31/04; C09D 131/04; C09D 5/031; C09D 151/003; C09J 9/00; C09J 131/04

USPC .......................................................... 523/201
See application file for complete search history.

(56) References Cited

U.S. PATENT DOCUMENTS

| | | | |
|---|---|---|---|
| 4,315,085 A | 2/1982 | Ozari et al. | |
| 4,413,068 A | 11/1983 | Sinclair et al. | |
| 5,177,122 A | 1/1993 | Shih | |
| 10,351,689 B2 * | 7/2019 | Liu | ................ C08F 6/006 |
| 10,442,882 B2 * | 10/2019 | Liu | ................ C08F 6/006 |
| 2003/0065079 A1 | 4/2003 | Weitzel | |
| 2009/0043035 A1 | 2/2009 | Cabrera | |

FOREIGN PATENT DOCUMENTS

| | | |
|---|---|---|
| CN | 104231142 A | 12/2014 |
| EP | 0 394 774 A1 | 10/1990 |
| EP | 0 327 199 B1 | 11/1993 |
| EP | 0 614 919 A1 | 9/1994 |
| WO | WO 2010/043653 A1 | 4/2010 |

OTHER PUBLICATIONS

M. J. Devon et al, Journal of Applied Polymer Science, "Effects of Core-Shell Latex Morphology on Film Forming Behavior" vol. 39 pp. 2119-2128 (1990).
M. Okubo, Macromol Chem Macromol Symp., "Control of Particle Morphology in Emulsion Polymerization" 35/36 pp. 307-325 (1990).

* cited by examiner

*Primary Examiner* — Hannah J Pak
(74) *Attorney, Agent, or Firm* — Lynn B. Morreale

(57) ABSTRACT

A method of forming latex composite polymer particles produces hydrolysis resistant, composite polymer particles that can be used in aqueous latex compositions. Each of the latex composite polymer particles includes a first phase comprising a vinyl ester oligomer or polymer; optionally, an intermediate phase; and at least one second phase comprising an acrylic oligomer or polymer, a styrene oligomer or polymer, an acrylic-styrene copolymer, or mixtures thereof. The second phase and/or the intermediate phase at least partially encapsulates the first phase. The intermediate and second phases are more hydrophobic than the first phase. Optionally, the first phase, the second phase, and/or the intermediate phase may further comprise a cross-linking agent.

18 Claims, 5 Drawing Sheets

HYDROLYSIS RESISTANT VINYL ESTER CONTAINING LATEXES

CROSS-REFERENCE TO RELATED APPLICATIONS

This application is a national stage application under 35 U.S.C. § 371 of PCT/US2017/038124 filed Jun. 19, 2017, which claims benefit to U.S. patent application Ser. No. 62/352,086, filed Jun. 20, 2016.

FIELD OF THE INVENTION

This disclosure relates generally to hydrolysis resistant vinyl acetate-containing latexes and processes of making the same. More specifically, the present disclosure relates to technology in which a polymer and/or copolymer core is at least partially encapsulated within a polymeric sheath that is more hydrophobic.

BACKGROUND OF THE INVENTION

The statements in this section merely provide background information related to the present invention and may not constitute prior art.

Structured composite or core-shell type particles may be used in a variety of applications that span multiple market areas and/or fields. For example, core-shell type particles can be used as fillers, extenders, or opacifiers in paints and coatings, as well as impact modifiers in thermoplastics, plastics and as carriers for biomolecules. However, conventional structured composite or core-shell particles generally have an outer shell that is more hydrophilic than the inner core. The encapsulation of a hydrophilic core by a hydrophobic shell in an aqueous system is not thermodynamically favored. In addition, the encapsulation process is rendered more difficult in that many polymer cores have a $T_g$ that is lower than the reaction temperature(s) encountered, thereby, facilitating polymer chains interpenetration and the "softening" of the core during processing.

European Patent No. 0327199B1 describes a process for preparing a dispersion of composite particles. This process comprises mixing first particles with a liquid dispersion of polymer particles. The polymer particles are stable against particle-particle flocculation and agglomeration. The mixing takes place at a temperature above the operative glass transition temperature of the polymer particles and under a condition where the difference in the interfacial energy of the first particle surface/liquid interface and the first particle surface/polymer interface divided by the interfacial energy of the polymer particle surface/liquid interface is equal to or greater than $(1-V_p^{2/3})/V_c^{2/3}$, $V_p$ and $V_c$ represent the relative volumes of the average polymer particle and the average first particle, respectively, with the constraint that the sum of $V_p$ and $V_c$ equals 1. The first particles are able to make contact with the surfaces of the polymer particles so that when contact occurs between first particles and polymer particles, composite particles are produced as a dispersion in the liquid phase, the particles having stability against particle-particle flocculation and agglomeration.

An article by M. J. Devon, et al. published in *Journal of Applied Polymer Science*, 39, 2119-2128 (1990) describes a series of core-and-shell latex particles made from methyl methacrylate/butyl acrylate copolymers. The latexes are monodisperse in particle size. The polymer hardness is varied by changing the methyl methacrylate/butyl acrylate ratio between the limits of 40/60 and 60/40 parts by weight Thinner, softer shells on harder cores require higher drying temperatures than thicker shells with the same composition because the former are required to deform more to produce void-free films.

An article by M. Okubo published in *Macromol. Chem., Macromol. Symp.*, 35/36, 307-325 (1990) describes submicron-size composite polymer particles that consist of two kinds of polymers produced by seeded emulsion polymerization. Since most polymer pairs are not compatible, phase separation of the polymers proceeds throughout the polymerization and results in different morphologies that can affect some properties.

SUMMARY OF THE INVENTION

The present disclosure generally provides hydrolysis-resistant latex composite polymer particles for use in aqueous latex compositions or thermoplastics. The latex composite polymer particles comprise, consist essentially of, or consist of at least one first phase; optionally, at least one intermediate phase; and at least one second phase. The first phase comprises a vinyl ester oligomer or polymer, while the second phase comprises an acrylic oligomer or polymer, a styrene oligomer or polymer, an acrylic-styrene copolymer, or a mixture thereof. The optional intermediate phase is configured such that it is located between the first phase and the second phase. The intermediate phase and/or the second phase at least partially encapsulates the first phase, such that the second phase and the intermediate phase, when present, is at least as hydrophobic, or preferably is more hydrophobic, than the first phase. Optionally, at least one or more of the first phase, the intermediate phase, and the second phase may further include a cross-linking agent, such that the first phase, the intermediate phase, or the second phase is at least partially cross-linked, e.g., has minimal cross linking density.

According to one aspect of the present disclosure, the vinyl ester oligomer or polymer comprises functionality selected from the group consisting of vinyl acetate, vinyl propionate, vinyl butyrates, vinyl benzoate, and vinyl pivalate. Alternatively, the vinyl ester oligomer or polymer comprises vinyl acetate functionality. When desirable, the first phase may further comprise copolymers of acrylate and (meth)acrylate functionality, phosphorous containing (meth) acrylate functionality, acid-containing functionality, phosphorous-containing acid functionality, or a mixture thereof.

The intermediate phase, when present, may comprise, without limitation, copolymers having aliphatic or aromatic functionality along with acrylate or acrylic functionality provided that the intermediate phase and/or second phase, when present, is more hydrophobic than the first phase. Alternatively, the intermediate phase comprises polymers having methyl methacrylate and/or butyl acrylate functionality.

The optional cross-linking agent in the first phase, the second phase, and/or the intermediate phase can be, for example, divinyl benzene, bis methylene acrylamide, divinyl adipate, ally methyacrylate (AMA), or ethylene glycol dimethacrylate (EGDMA), among others. One or more of the first phase, the intermediate phase, and the second phase optionally may be at least partially cross-linked.

According to another aspect of the present disclosure, the latex composite polymer particles may exhibit an overall weight ratio of the second phase and/or the intermediate phase, when present, to the first phase may be between about 1:10 to about 20:1. The latex composite polymer particles may be used in a coating, paint, adhesive, sealant, caulk, or ink or as an additive to thermoplastics and plastics. Alternatively, the composite polymer particles may be used in a powder application.

According to another aspect of the present disclosure, the composite polymer particles may have an occluded particle configuration or a core-shell configuration. In the core-shell configuration, the first phase comprises at least one inner polymeric core; the intermediate phase, when present, comprises at least one intermediate layer configured between the inner core and the second phase; and the second phase comprises at least one outer shell layer. The intermediate and/or shell layers at least partially encapsulate the inner polymer core. Optionally, one or more of the polymeric core, the intermediate layer, and the shell layer comprises a cross-linking agent, such that the polymer core, the intermediate layer, or the shell layer is at least partially cross-linked. In addition, the shell layer and the intermediate layer, when present, is more hydrophobic than the polymeric core.

The core-shell particles may have an average particle size between about 50 nanometers and about 500 nanometers and the outer shell has a thickness that is between about 5-100 nm, preferably between about 15-100 nm, as measured using transition electron microscopy (TEM).

According to yet another aspect of the present disclosure a latex composition may be formed that comprises a plurality of the latex composite polymer particles dispersed in an aqueous medium. This latex composition may form, without limitation, a coating, paint, adhesive, sealant, caulk, thermoplastic or ink that can be used in a variety of applications.

The latex composition may comprise up to about 65 wt. % of the layered polymer particles based on the overall weight of the latex. The latex composition may be used to form a coating, paint, adhesive, sealant, caulk, thermoplastic, or ink that is water or hydrolysis resistant. When desirable, the latex composition may further comprise one or more additives selected from the group of additional polymers, pigments or colorants, fillers, dispersants or surfactants, coalescent agents, pH neutralizing agents, plasticizers, defoamers, thickeners, biocides, co-solvents, rheology modifiers, wetting or spreading agents, leveling agents, conductive additives, adhesion promoters, anti-blocking agents, anti-cratering agents or anti-crawling agents, anti-freezing agents, corrosion inhibitors, anti-static agents, flame retardants, optical brighteners, UV absorbers or other light stabilizers, chelating agents, crosslinking agents, flattening agents, flocculants, humectants, insecticides, lubricants, odorants, oils, waxes or anti-slip aids, soil repellants, and stain resistant agents.

According to still another aspect of the present disclosure, a method of forming the hydrolysis resistant, latex composite polymer particles described above and further defined herein for use in aqueous latex compositions is provided. This method generally comprises the steps of providing or forming at least one polymeric first phase; forming at least one of an intermediate phase and a second phase that at least partially encapsulates the first phase; and collecting the composite polymer particles. The latex composite polymer particles that are formed have a second phase and an intermediate phase, when present, that are more hydrophobic by nature than the first phase. When both the intermediate and shell layers are present, the intermediate phase is located between the first phase and the second phase. Optionally, the first phase, the second phase, and/or the intermediate phase, may include a cross-linking agent. The first phase may comprise a vinyl acetate oligomer, homopolymer, or copolymer, while the second phase comprises an acrylic oligomer or polymer, styrene oligomer or polymer, acrylic-styrene copolymers, or mixtures thereof. When desirable, the method may further comprise partially cross-linking one or more of the at least one first phase, the intermediate phase, and the second phase.

The composite polymer particles formed according to this method may include an occluded particle configuration or a core-shell configuration as previously described above and further defined herein.

According to another aspect of the present disclosure, the first phase exhibits a glass transition temperature ($T_g$) and the forming of the intermediate and/or shell phases is performed at a reaction temperature that can be either higher or lower than the $T_g$ of the first phase. When desirable, the $T_g$ of the first phase may be equal to or lower than the reaction temperature. The intermediate phase, when present, may comprise oligomers or polymers having aliphatic or aromatic functionality along with acrylate or acrylic functionality. Alternatively, the intermediate phase comprises polymers of methyl methacrylate and/or butyl acrylate. A latex product composition comprising a plurality of the layered polymer particles formed according to the method described above and further defined herein dispersed in an aqueous medium.

Further areas of applicability will become apparent from the description provided herein. It should be understood that the description and specific examples are intended for the purpose of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1A:
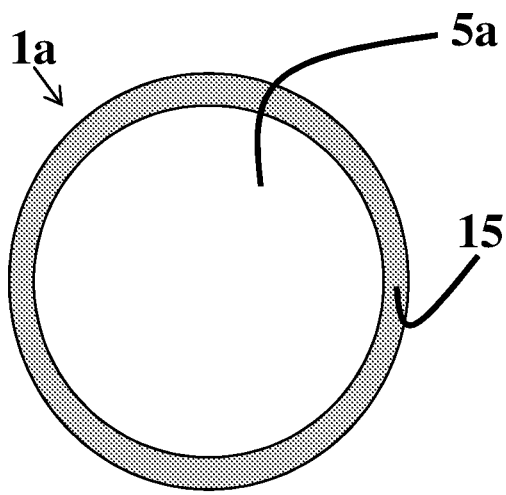
FIG. 1A is a schematic cross-sectional view of a composite polymer particle according to the teachings of the present disclosure having a core-shell configuration.

The following description is merely exemplary in nature and is in no way intended to limit the present disclosure or its application or uses. For example, the latex composite polymer particles made and used according to the teachings contained herein is described throughout the present disclosure in conjunction with being incorporated into paints in order to more fully illustrate the composition and the use thereof. The incorporation of the latex composite polymer particles in latex compositions that are used in other applications or products are contemplated to be within the scope of the present disclosure. Such latex compositions may include but not be limited to coatings, paints, adhesives, sealants, caulks, thermoplastics, plastics, or inks. The latex composite polymer particles may also be dried and used in a powder application without exceeding the scope of the present disclosure. It should be understood that throughout the description, corresponding reference numerals indicate like or corresponding parts and features.

The present disclosure generally provides a process for forming water or hydrolysis resistant, latex composite polymer particles, as well as latex compositions that incorporate a plurality of these composite polymer particles. According to one aspect of the present disclosure a method of encapsulating polyvinyl acetate or co-polymers formed as a reaction product from vinyl ester monomers and acrylate monomers or acid-containing monomers within a polymeric sheath. This encapsulation process produces composite polymer particles that may include a first phase which may be a single polymeric core or multiple occluded polymeric domains and at least one of an intermediate phase and second phase, such that the intermediate phase and/or second phase is more hydrophobic than the first phase (e.g., individual polymeric core(s) or multiple occluded domains).

For the purpose of this disclosure, occluded polymeric domains comprise a separation or segregation between the first phase and at least one of the intermediate phase or second phase. The occurrence of such phase separation results in the formation of multiple first domains or phases having islands or domains of the intermediate phase or second phase disseminated or spread throughout. The occurrence of flocculation or aggregation between multiple occluded polymeric domains may occur and is considered to be within the scope of the present disclosure.

As used herein, the term, latex, refers to a dispersion of polymer particles in an aqueous medium. This latex, may include but not be limited to an emulsion in an aqueous medium of finely divided particles of rubber or plastic particles. The aqueous medium includes, without limitation, water with or without the presence of a soluble or miscible co-solvent, such as alcohols, ketones, esters, and glycol ethers, among others.

As used herein, a core-shell configuration refers to at least one inner phase, referred to as a core that is at least partially or fully encapsulated by at least a second phase, referred to as a shell. The shell is typically the outermost layer and may include one or more sub-layers. In a core-shell configuration, when desirable, there may be one or more intermediate phases configured between the inner core and the outer shell that is capable of enhancing the compatibility between the core and the shell.

Latex compositions formulated using the latex composite polymer particles of the invention are capable of resisting high pH hydrolysis, which is desirable for use in many applications, such as paints and coatings.

Referring to FIGS. 1A/B and 2A/B, the latex composite polymer particles 1a, 2a generally comprise, consist essentially of, or consist of a first phase 5(a, b) comprising either a polymeric core 5a or multiple occluded polymeric domains 5b, and at least one of an intermediate phase 10 and a second phase 15 that at least partially encapsulates the first phase 5(a, b), such that the intermediate phase 10 or second phase 15 is more hydrophobic by nature than the first phase 5(a, b).

Figure 1B:
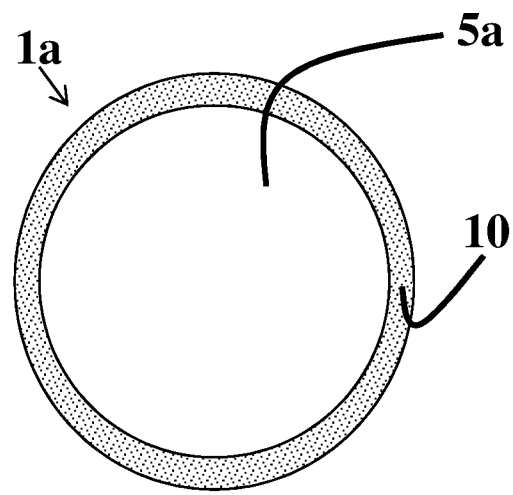
FIG. 1B is a schematic cross-sectional view of another composite polymer particle formed according to the teachings of the present disclosure having a core-shell configuration.
Figure 1C:
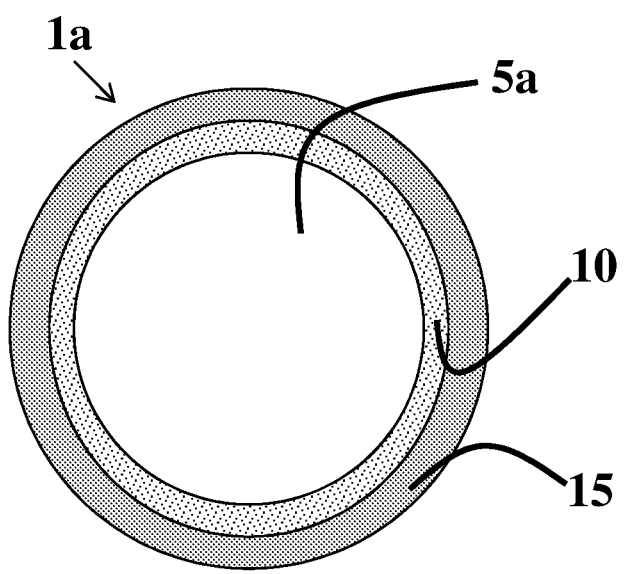
FIG. 1C is a schematic cross-sectional view of yet another composite polymer particle formed according to the teachings of the present disclosure having a core-shell configuration.
Figure 2A:
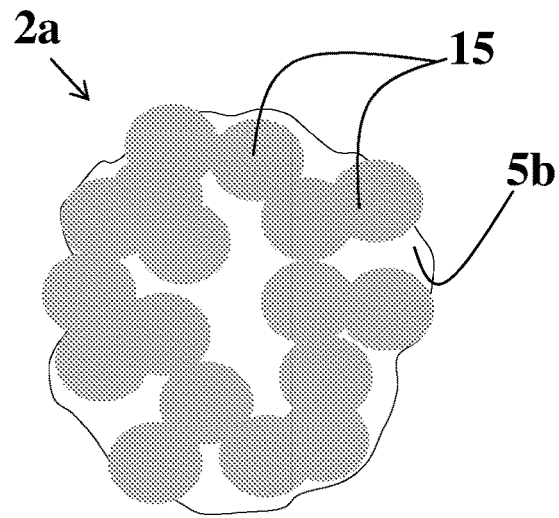
FIG. 2A is a schematic cross-sectional view of a composite polymer particle having an occluded configuration according to the teachings of the present disclosure.
Figure 2B:
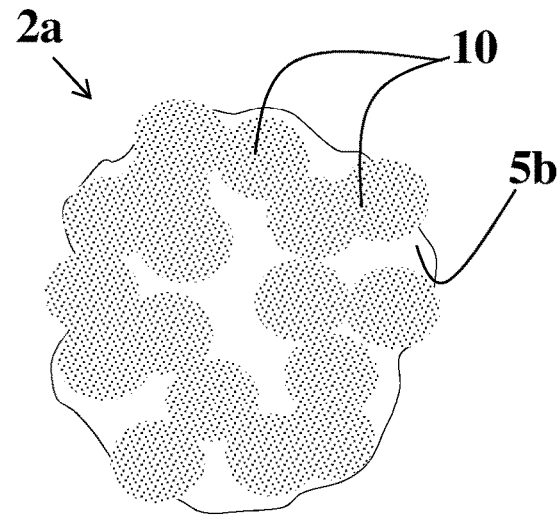
FIG. 2B is a schematic cross-sectional view of another composite polymer particle having an occluded configuration according to the teachings of the present disclosure.
Figure 2C:
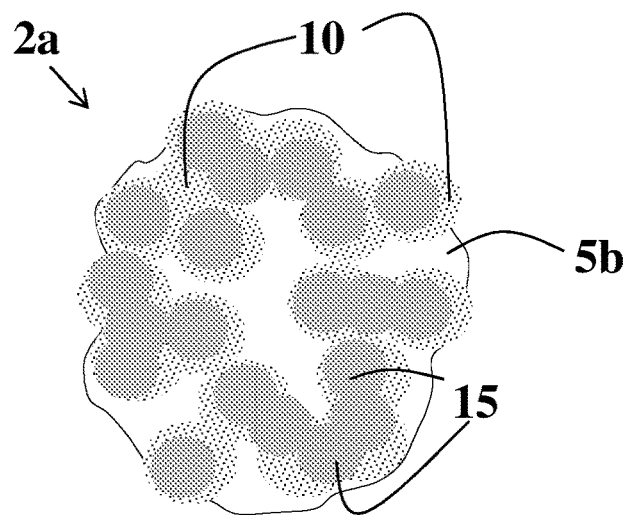
FIG. 2C is a schematic cross-sectional view of yet another composite polymer particle having an occluded configuration according to the teachings of the present disclosure.

Referring now to FIGS. 1C and 2C, the latex composite polymer particles 1a, 2a may further comprise, when desirable, an intermediate phase 10 that is located between the first phase 5(a, b) and the one or more second phases 15. Optionally, the first phase 5(a, b), the second phase 15, and/or the intermediate phase 10 may further comprise a cross-linking agent that is capable of causing the occurrence of cross-linking.

The first phase 5(a, b) may be selected as a homo-polymer or as a co-polymer or a mixture of two or more polymers such that the first phase 5(a, b) is more hydrophobic in nature than the intermediate 10 and/or second 15 phase(s). The homopolymer used to form the first phase 5(a, b) can be entirely (~100%) comprised of a vinyl ester polymer. The copolymer or mixture of two or more polymers used to form the first phase 5(a, b) may comprise without limitation a reaction product formed from vinyl ester monomers with acrylate monomers or acid-containing monomers.

Vinyl ester monomers that may be used in forming the first phase include, but are not limited to, vinyl acetate, vinyl propionate, vinyl butyrates, vinyl benzoate, vinyl pivalate, and similar vinyl esters and combinations thereof. Several examples of acrylate monomers used in forming the first phase include, without limitation, methyl (meth)acrylate, ethyl (meth)acrylate, butyl (meth)acrylate, tert-butyl acrylate, 2-ethylhexyl (meth)acrylate, lauryl (meth)acrylate and glycidyl (meth)acrylate, as well as phosphorous-containing (meth)acrylate monomers, including but not limited to, 2-phosphoethyl (meth)acrylate, 2-phosphopropyl (meth)acrylate, 3-phosphopropyl (meth)acrylate, and 3-phospho-2-hydroxypropyl (meth)acrylate diethyl [(methacryloyloxy)methyl]phosphonate, diethyl [(acryloyloxy)methyl]-phosphonate, diethyl (methacryloyloxy)ethyl phosphate, diethyl (acryloyloxy)ethyl phosphate, (monoacryloxy)ethyl phosphate and 2-(methacryloyloxy)ethyl phosphate, propyl N,N-tetramethylbis(phosphonate)-2-hydroxylbismethyl-eneamine methyl methacrylate, and 2-[2,2-bis(diisopropoxyphosphoryl)ethoxy]methyl methacrylate, and combinations thereof, to name a few. Similarly, several examples of acid-containing monomers used to form the first phase include, but are not limited to, (meth)acrylic acid, acryloxypropionic acid, (meth)acryloxypropionic acid, itaconic acid, aconitic acid, maleic acid or anhydride, fumaric acid, crotonic acid, monomethyl maleate, monomethyl fumarate, monomethyl itaconate and the like, as well as phosphorous-containing acid monomers including, without limitation, vinyl phosphonic acid, allyl phosphonic acid, 2-acrylamido-2-methylpropanephosphonic acid, α-phosphonostyrene, and 2-methylacrylamido-2-methylpropanephosphonic acid, and combinations thereof.

The weight ratio of vinyl ester monomers to acrylate or acid-containing monomers used to form the copolymer or mixture of two polymers that comprises the first phase 5(a, b) may range between about 99:1 and 1:99; alternatively, between about 80:20 and 20:80; alternatively, between about 60:40 and 40:60. When desirable, additional hydrophilic functionality may be incorporated into the polymers or co-polymer that comprises the first phase. Several examples of such hydrophilic functionality include but are not limited to hydroxyl groups, carbonyl groups, carboxyl groups, amino groups, sulfhydryl groups, and phosphate groups. Similarly, the copolymers that comprise the first phase may include one or more hydrophilic linkages, including without limitation ethers linkages, ester linkages, phosphodiester linkages, and glycolytic linkages.

As used herein, the term, functionality, refers to the presence of functional groups in an oligomer, polymer, or copolymer. The presence of such functional groups in an oligomer, polymer, or copolymer may be formed, without limitation, through the polymerization of monomers. For example, an oligomer or polymer that comprises vinyl acetate functionality may be formed as a reaction product between vinyl acetate monomers.

One embodiment of a first phase comprises a copolymer formed as a reaction product from vinyl acetate monomers and butyl acrylate monomers in a ratio of about 80:20. The butyl acrylate (BA) monomers are more hydrophobic than the vinyl ester monomers. Thus, when sufficient BA monomers are used in the formation of the first phase, an intermediate layer may not be necessary or desired. In other words, by increasing the amount of butyl acrylate used to form the reaction product that comprises the first phase, the first phase is able to effectively interact directly with the second phase in the absence of any intermediate phase as shown in FIGS. 1A and 2A.

A function of the intermediate phase is to bridge the difference in hydrophilicity or hydrophobicity that exists between the first phase and the second phase. Thus the intermediate phase can enhance the adhesion between the first phase and the outer second phase as shown in FIGS. 1C and 2C. When the intermediate phase is used in combination with a second phase, the intermediate phase does not have to be cross-linked and may be formed so that it is as thin as possible or as desired.

The intermediate phase may also be used without the incorporation of a second phase as shown in FIGS. 1B and 2B. When the intermediate phase is used in this type of scenario, it is either cross-linked or made with sufficient thickness so that it may impart effective hydrolysis resistant properties to the latex composite polymer particles.

The intermediate phase may be comprised of a polymer formed as a reaction product from one or more monomers or oligomers that comprises aliphatic or aromatic functionality along with acrylate or acrylic functionality. For example, the intermediate phase may comprise, without limitation, a reaction product formed from methyl methacrylate (MMA) and butyl acrylate (BA). The weight ratio of MMA:BA may range from about 70:30 to about 10:90; alternatively, between about 75:25 to about 15:85; alternatively, between about 60:40 and 20:80.

The second phase may be comprised of a single layer or multiple sublayers provided that the resulting layer including any number of sublayer(s) are more hydrophobic in nature than the composition of the first phase. The second phase may comprise, without limitation, an acrylic polymer, a styrene polymer, or a copolymer or mixture thereof. When the second phase includes a combination of sublayers, these sublayers may be either the same or different in composition. This outer second phase provides the benefit to the composite polymer particles of protecting the underlying first phase from hydrolysis. In other words, the outer second phase allows the composite polymer particles to exhibit water or hydrolysis resistant properties.

For the purpose of this disclosure, the terms "water resistance", "water resistant", or "hydrolysis resistant" means the ability to retard the penetration or wetting by water in liquid form. Said terms are not intended to mean that the penetration or absorption of water is prevented from occurring in its entirety, but rather that said penetration is retarded, resisted, or limited for a period of time that is on the order of days, weeks, or years; alternatively, weeks or years.

When desirable, the optional cross-linking agent may be included either within the first phase, as part of the intermediate phase, or in the second phase. The cross-linking agent may include, but not be limited to, allyl methacrylate, butadienyl acetate, vinyl tiglate, divinyl oxalate, diallyl malonate, butadienyl succinate, divinyl adipate, vinyl fumarate, diallyl fumarate, diallyl maleate, vinyl itaconate, butadienyl itaconate, divinyl citraconate, etc.; diallyl cyanurate, divinyl cyanurate, tributenyl cyanurate, N,N',N"-triallyl melamine, N,N'-diallyl melamine, N,N-dibutenyl melamine, ethylene diacrylate, ethylene divinylacetate, ethylene glycol dimethacryalte (EGDMA), tetramethylene dimethacrylate, pentamethylene dimaleate, hexamethylene difumarate, triethylene glycol triacrylates, triethylene glycol trifumarate, and triethylene glycol tritiglate. Alternatively, the cross-linking agent is divinyl adipate or ethylene glycol dimethacrylate (EGDMA). The presence of the cross-linking agent is used to at least partially cross-link the first phase, the intermediate phase, and/or the second phase including the bulk and/or surface of the first phase and the intermediate or shell phases. In addition, various other additives may be incorporated into the aqueous emulsions or mixtures used to form the latex composite polymer particles, including, but not limited to emulsifiers, soaps, and oxidizers, without exceeding the scope of the present disclosure. The optional crosslinking agent may be included without limitation, up to about 10 wt. % based on the weight of the first phase; alternatively, at least about 0.05 wt. %; alternatively, between about 1 wt. % and about 8 wt. %.

When desirable, an initiator may be utilized during the polymerization of monomers to form the first phase, the second phase, or the intermediate phase. The initiator may be a thermal initiator or a redox initiator, including water-soluble initiators and/or oil-soluble initiators. Several examples of suitable water-soluble initiators include but are not limited to, inorganic peroxides, such as hydrogen peroxide; sodium-, potassium-, or ammonium-persulfate, among others, as well as organic peroxides, including but not limited to, t-butyl peroxide and t-amyl peroxide. Several examples of suitable oil-soluble initiators include but are not limited to, benzoyl peroxide or azobisisobutyronitrile (AIBN), among others. In addition, various combinations of reducing agents, including but not limited to sodium metabisulfate, sodium formaldehyde sulfoxylate, or a mixture of inorganic and organic salts (e.g., Bruggolite® FN6, Brueggemann Chemical US, Newtown Square, Pa.), may also be used as the optional initiator. For, example, a mixture of persulfate/pyrosulfite/thiosulfate can be used with copper sulfate as a co-catalyst or a mixture of potassium persulfate/sodium bisulfite with one or more of acetone, benzaldehyde, acetaldehyde, or methyl propyl ketone may be used without limitation. The weight ratio of the optional initiator to monomers used may include without limitation about 0.25; alternatively, about 0.1, alternatively, about 0.05.

Figure 3A:
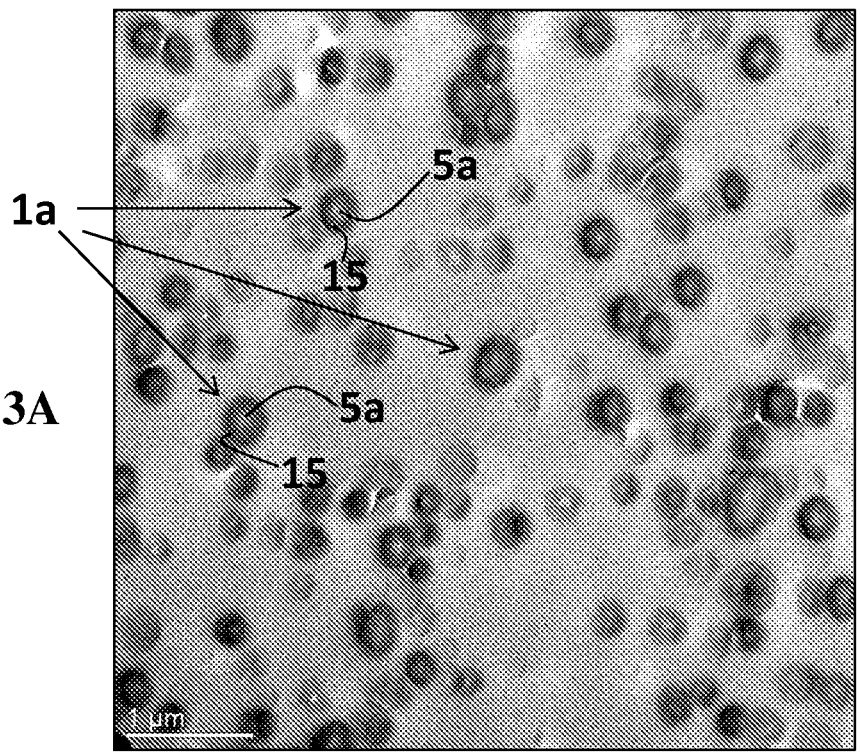
FIG. 3A is a transition electron microscope (TEM) image of the cross-section of composite polymer particles having a core-shell configuration formed according to the teachings of the present disclosure.
Figure 3B:
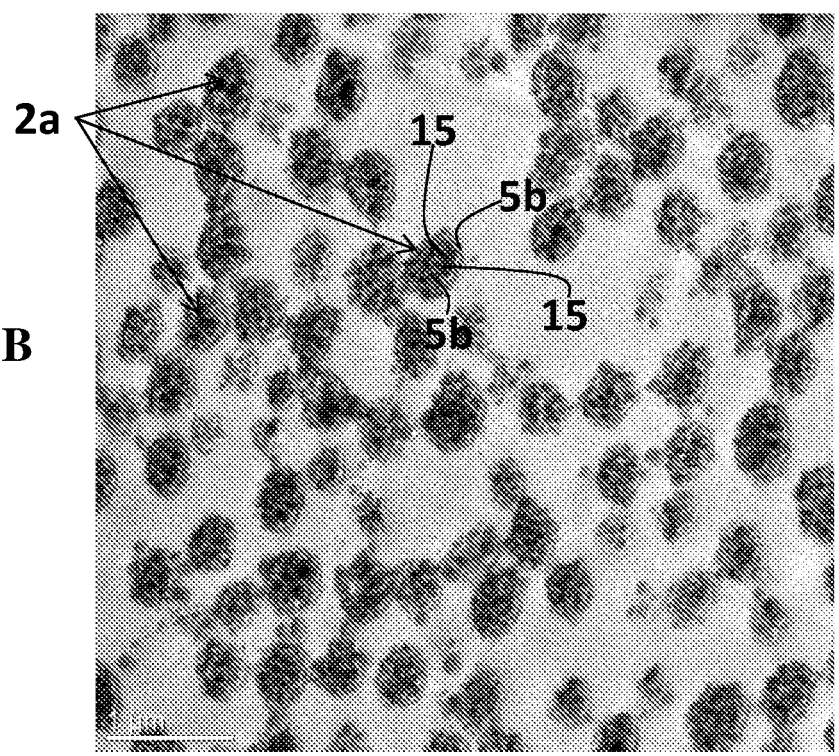
FIG. 3B is a transition electron microscope (TEM) image of the cross-section of layered polymer particles having an occluded configuration formed according to the teachings of the present disclosure.

Referring now to FIGS. 3A and 3B, the composite polymer particles, as formed, exhibit a particle size distribution having an average particle size that is within the range of about 50 nanometers to about 500 nanometers; alternatively, between about 75 nanometers and about 300 nanometers; alternatively, between about 100 nanometers and about 300 nanometers, using a dynamic light scattering technique (DSL), such as, for example, the techniques described in ISO 22412, ISO 13321, and/or ASTM E2490-09. In FIG. 3A, latex composite polymer particles 1a having a polymeric core 5a are shown, while in FIG. 3B, latex composite polymer particles 2a having multiple occluded polymeric domains 5b are described. The measurement of the average particle size distributions exhibited by the composite polymer particles may be accomplished using any known technique, for example, sieving, microscopy, Coulter counting, dynamic light scattering, or particle imaging analysis, to name a few. The thickness of the different phases in the composite polymer particles can be obtained using conventional microscopy techniques, such as transmission electron microscopy (TEM) or scanning electron micrsoscopy (SEM) with/without microtoming of the test samples, as well as cryogenic transmission electron microscopy (cryo-TEM) or scanning electron microscopy (cryo-SEM). Alternatively, cryogenic transmission electron microscopy (cryo-TEM) is utilized. The average particle size exhibited by the first phase, and the intermediate phase, the second phase, or combination thereof can be varied as desired. The combined weight ratio of the intermediate and second phase(s) to the first phase may be between about 1:10 to about 20:1; alternatively, between about 1:20 to about 15:1.

When the first phase comprises a single solid particle, often called a core, the overall thickness of the second phase, often called a shell, and/or the intermediate phase that is present may also be characterized as being between 20 nanometers and 300 nanometers. Alternatively, this overall thickness for core-shell particles, when present, may be between 22 nanometers and about 200 nanometers; alternatively, between 25 nanometers and about 65 nanometers. If the thickness of the second phase (e.g., shell) or intermediate phase, as well as the combined thickness of the second phase and the intermediate phase when both are present, becomes smaller than 20 nanometers severe hydrolysis of the first phase or cores may occur.

Since the composition of the first phase can vary, as well as the composition of the second phase and the intermediate phase (when present), the properties, such as glass transition temperature ($T_g$), exhibited by the latex composite polymer particles can also vary. The composition of each of the phases in the composite polymer particles can be selected as predetermined by the properties for the particles or latex compositions that are desired or required in the given application. When desired, the $T_g$ exhibited by the first phase may be equal to or less than the reaction temperature utilized to form either the second phase or the intermediate phase, when present.

The latex composite polymer particles may be used, without limitation, in a coating, paint, adhesive, sealant, caulk, thermoplastic, plastic, or ink. The latex composite polymer particles of the present disclosure exhibit enhanced water resistance, which decreases the susceptibility of the first phase from undergoing hydrolysis reactions. Thus the latex composite polymer particles of the present disclosure are capable of enhancing the shelf life and providing a means of reducing the cost associated with high performance latex products formulated therefrom. The composite polymer particles may also be used in such coatings, paints, adhesives, sealants, caulks, inks, thermoplastics, or other high performance latex compositions for other purposes. For example, the layered polymer particles may be used as binders or pigments in the formulated latex products depending upon the composition of the outer layer that is present for the composite polymer particles. When desirable, the latex composite polymer particles may also be dried and used in a powder application.

According to another aspect of the present disclosure, a latex composition is formed that comprises a plurality of the latex composite polymer particles dispersed in an aqueous medium. These latex compositions may comprise up to about 85 wt. %, alternatively, up to about 65 wt. % of the composite polymer particles based on the overall weight of the latex composition. The lower limit for incorporation of the latex composite polymer particles into the latex composition may set at about 1 wt. %; alternatively, 5 wt. %; alternatively, about 15 wt. %; alternatively, about 25 wt. %; alternatively, about 50 wt. % based on the overall weight of the latex composition.

The latex composition may be used, with or without the incorporation of other additives, as a coating, paint, adhesive, sealant, caulk, thermoplastic, or ink that exhibits stability against hydrolysis or in other words, is water resistant. The coating, paint, adhesive, sealant, caulk, thermoplastic, or ink may be used, without limitation, in a traffic paint application, in a decorative application, as a pressure-sensitive adhesive, in a deck application, in a roof application, in a "dry-fall" application, or in a primer application.

The latex compositions may further comprise, consist of, or consist essentially of one or more additional polymers, as well as any other known or desired additives. The additional polymers may include, but not be limited to, a polymer or copolymer that is derived from one or more of (meth) acrylate, vinyl aromatic, ethylenically unsaturated aliphatic, or vinyl ester monomers, as well as various combinations thereof. The other additives, may comprise without limitation, any type of pigments or colorants, fillers, dispersants or surfactants, coalescent agents, pH neutralizing agents, plasticizers, defoamers, surfactants, thickeners, biocides, co-solvents, rheology modifiers, wetting or spreading agents, leveling agents, conductive additives, adhesion promoters, anti-blocking agents, anti-cratering agents or anti-crawling agents, antifreezing agents, corrosion inhibitors, anti-static agents, flame retardants, optical brighteners, UV absorbers or other light stabilizers, chelating agents, crosslinking agents, flattening agents, flocculants, humectants, insecticides, lubricants, odorants, oils, waxes or anti-slip aids, soil repellants, or stain resistant agents, as well as mixtures and combinations thereof. The selection of additives incorporated into a coating composition is determined based on a variety of factors, including the nature of the acrylic polymer or latex dispersion and the intended use of the coating composition, to name a few.

Several examples of pigments and colorants include, without limitation, metal oxides, such as titanium dioxide, zinc oxide, or iron oxide, as well as organic dyes, or combinations thereof. Examples of fillers may include, but not be limited to, calcium carbonate, nepheline syenite, feldspar, diatomaceous earth, talc, aluminosilicates, silica, alumina, clay, kaolin, mica, pyrophyllite, perlite, baryte, or Wollastonite, and combinations thereof.

Several examples of co-solvents and plasticizers include ethylene glycol, propylene glycol, diethylene glycol, and combinations thereof, among others. Typical coalescents, which aid in film formation during drying, include but are not limited to, ethylene glycol monomethyl ether, ethylene glycol monobutyl ether, ethylene glycol monoethyl ether acetate, ethylene glycol monobutyl ether acetate, diethylene glycol monobutyl ether, and diethylene glycol monoethyl ether acetate, as well as combinations thereof.

Several examples of dispersants may include, without limitation, any known nonionic surfactants, such as ammonium, alkali metal, alkaline earth metal, and lower alkyl quaternary ammonium salts of sulfosuccinates, higher fatty alcohol sulfates, aryl sulfonates, alkyl sulfonates, alkylaryl sulfonates and/or ionic surfactants, such as alkylphenoxy polyethoxyethanols or ethylene oxide derivatives of long chain carboxylic acids, as well as polyacid dispersants, such as polyacrylic acid or polymethylacrylic acid or salts thereof, and hydrophobic co-polymeric dispersants, such as co-polymers of acrylic acid, methacrylic acid, or maleic acid with hydrophobic monomers.

Several examples of the thickening agents may include, without limitation, hydrophobically modified ethylene oxide urethane (HEUR) polymers, hydrophobically modified alkali soluble emulsion (HASE) polymers, hydrophobically modified hydroxyethyl celluloses (HMHECs), hydrophobically modified polyacrylamide, and combinations thereof.

The incorporation of various defoamers, such as, for example, polydimethylsiloxanes (PDMS) or polyether-modified polysiloxanes, may be done to minimize frothing during mixing and/or application of the coating composition. Suitable biocides can be incorporated to inhibit the growth of bacteria and other microbes in the coating composition during storage.

Thermoplastic composites and coatings, which may include, without limitation, paints, adhesives, sealants, caulks, and inks, formed from the latex compositions described herein, as well as methods of forming these thermoplastics and coatings are believed to be within the scope of the present disclosure. Generally, coatings are formed by applying a coating formulation described herein to a surface, and allowing the coating to dry to form the coating or film. Thermoplastic composites may be formed by casting, molding, extruding, or any other means known in the art. The resulting dried coatings and thermoplastic composites typically comprise, at minimum, a plurality of composite polymer particles. The coating or thermoplastic formulations and/or the dried coatings or thermoplastic composites can further comprise one or more additional polymers and/or additives as described above or known to one skilled in the art. The coating thickness can vary depending upon the application of the coating. The thickness of the coating may be any thickness desirable for use in a particular application; alternatively, the range for the dry thickness of the coating is between about 0.025 mm (1 mil) to about 2.5 mm (100 mils).

The coatings can be applied to a variety of different surfaces including, but not limited to metal, asphalt, concrete, stone, ceramic, wood, plastic, polymer, polyurethane foam, glass, and combinations thereof. The coatings can be applied to the interior or exterior surfaces of a commercial product or manufactured good or item. When desirable, the surface may be an architectural surface, such as a roof, a wall, a floor, or a combination thereof.

When desirable, the latex compositions may further comprises one or more additives selected from the group of additional polymers, pigments or colorants, fillers, dispersants or surfactants, coalescent agents, pH neutralizing agents, plasticizers, defoamers, thickeners, biocides, co-solvents, rheology modifiers, wetting or spreading agents, leveling agents, conductive additives, adhesion promoters, anti-blocking agents, anti-cratering agents or anti-crawling agents, antifreezing agents, corrosion inhibitors, anti-static agents, flame retardants, optical brighteners, UV absorbers or other light stabilizers, chelating agents, crosslinking agents, flattening agents, flocculants, humectants, insecticides, lubricants, odorants, oils, waxes or anti-slip aids, soil repellants, and stain resistant agents.

Figure 4:
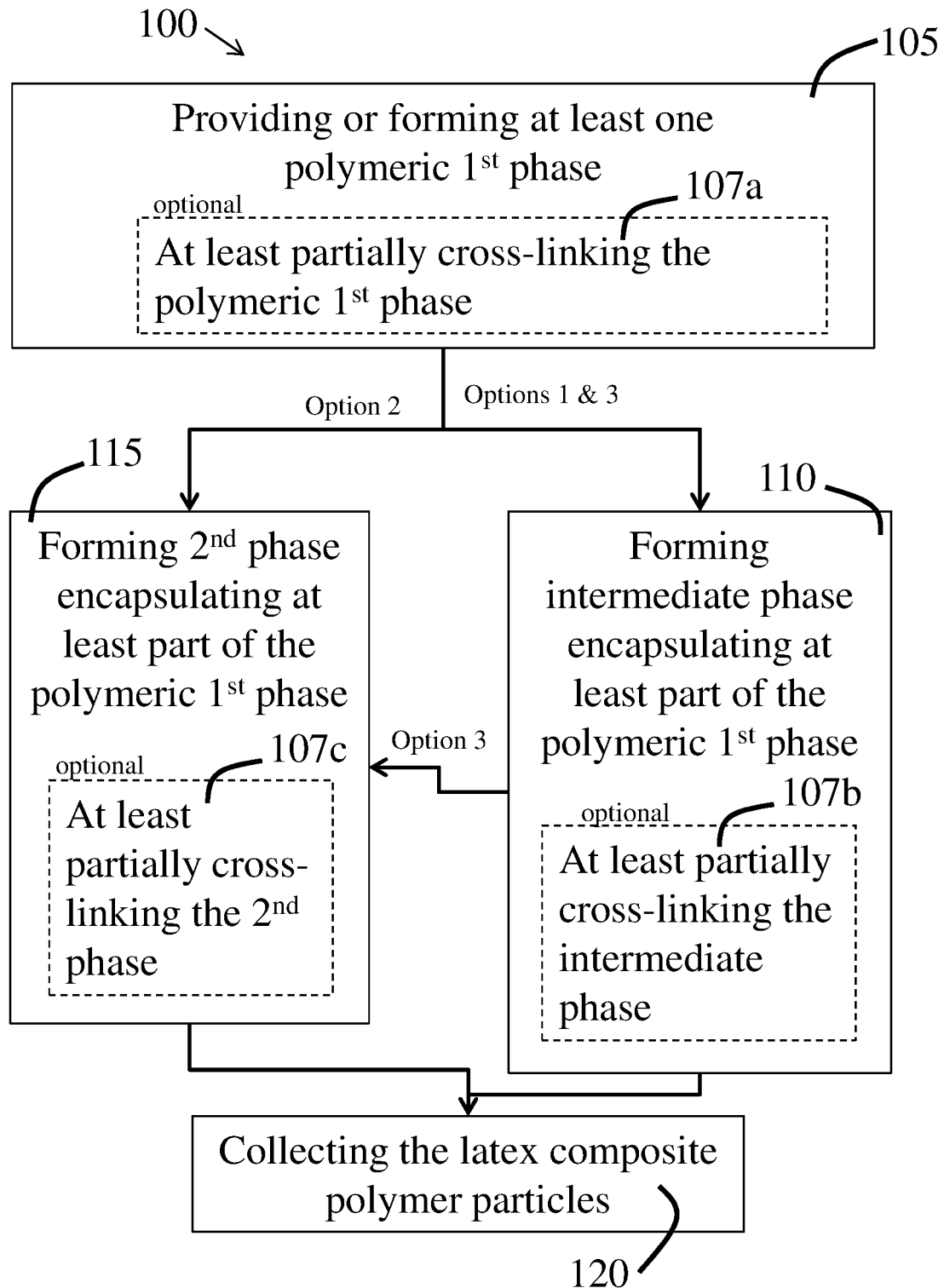
FIG. 4 is a schematic representation of a method for forming composite polymer particles according to the teachings of the present disclosure.

Referring now to FIG. 4, a method 100 of forming hydrolysis resistant, latex composite polymer particles for use in a latex composition is provided. This method 100 generally comprises, consists of, or consists essentially of providing or forming 105 at least one first phase; forming at least one of an intermediate phase 110 (options 1 &3) and/or a second phase 115 (options 2 & 3) that at least partially encapsulates the first phase; and collecting 120 the latex composite polymer particles. The formed latex composite polymer particles comprise one or more first phases that are hydrophilic by nature, while the intermediate and shell phase(s) are more hydrophobic by nature. A plurality of these composite polymer particles may be subsequently dispersed in an aqueous medium to form a latex composition that may be used, without limitation, as a coating, paint, adhesive, sealant, caulk, or ink. The polymer composite particles may also be used as an additive for thermoplastics and plastics to improve or enhance properties.

Still referring to FIG. 4, the first phase, intermediate phase, and/or second phase may optionally comprise a cross-linking agent, such that the method further comprises at least partially cross-linking the first phase (107a), the intermediate phase (107b), or the second phase (107c). The first phase of each of the composite polymer particles provided or formed 105 by this method 100 comprises a vinyl acetate homopolymer or a copolymer or mixture of two or more polymers formed as a reaction product from vinyl ester monomers and acrylate monomers or acid-containing monomers as previously described above. The first phase, which is polymerized from monomers, may be used in-situ for the formation of the composite polymer particles or provided as commercially available poly(vinyl acetate) latex particles.

The intermediate phase that is formed 110 may be comprised of a polymer formed as a reaction product from one or more monomers or oligomers that comprises aliphatic or aromatic functionality along with acrylate or acrylic functionality. For example, the intermediate phase may comprise, without limitation, a reaction product formed from methyl methacrylate (MMA) and butyl acrylate (BA). The second phase that is formed 115 comprises an acrylic polymer, a styrene polymer, or a copolymer or mixture thereof. The first phase exhibits a glass transition temperature ($T_g$) and the forming of the intermediate 110 and/or second phases 115 is performed at a reaction temperature, such that the $T_g$ of the first phase may be equal to or lower than the reaction temperature.

Figure 5A:
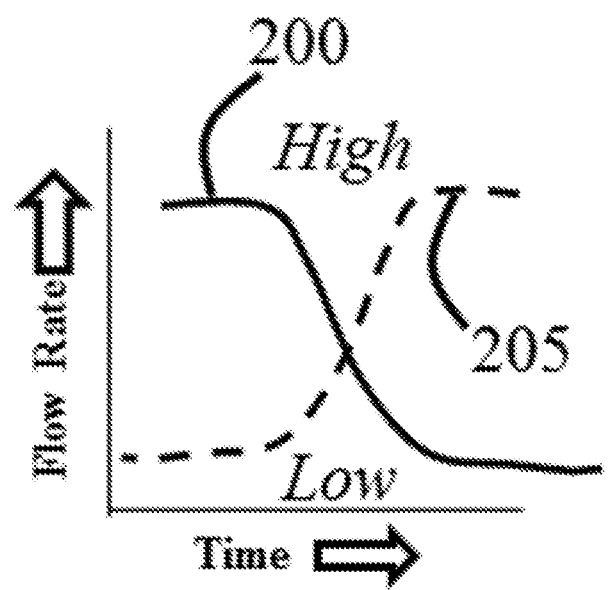
FIG. 5A is a graphical representation of the flow rates for a 1$^{st}$ pre-emulsion mixture and a 2$^{nd}$ pre-emulsion mixture plotted as a function of time over which the mixtures are added to the vessel comprising the aqueous dispersion of the first phase according to one aspect of the present disclosure.
Figure 5B:
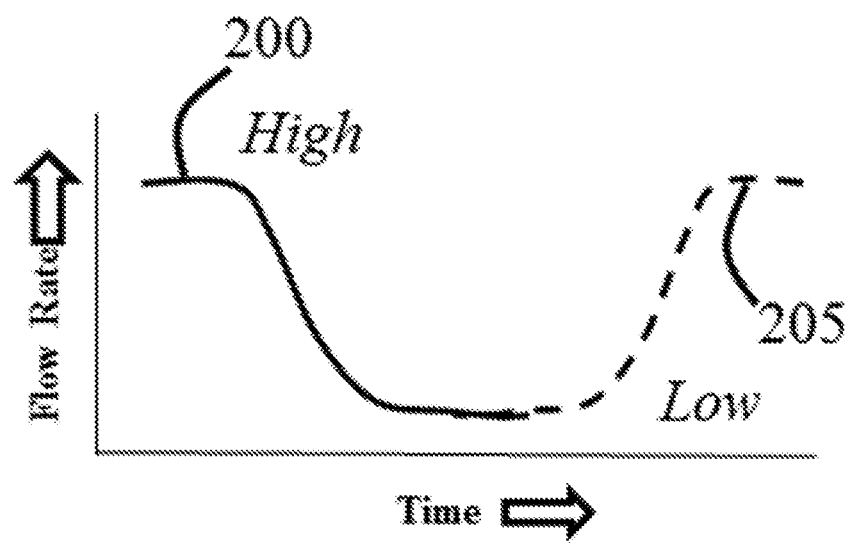
FIG. 5B is a graphical representation of the flow rates for a 1$^{st}$ pre-emulsion mixture and a 2$^{nd}$ pre-emulsion mixture plotted as a function of time over which the mixtures are added to the vessel comprising the aqueous dispersion of the first phase according to another aspect of the present disclosure.

Referring now to FIGS. 5A and 5B, the intermediate phase, when present, and the second phase can be formed 110, 115 by sequential continuous feeding or power feeding one or more polymers used to form the intermediate phase and/or the second phase to a vessel that is charged with the first phase dispersed in an aqueous medium. According to one aspect of the present disclosure (in FIG. 5A), the polymers used to form the intermediate phase is fed as a first aqueous pre-emulsion mixture at a $1^{st}$ variable flow rate 200 and the polymers used to form the second phase is fed as a second aqueous pre-emulsion at a $2^{nd}$ variable flow rate 205. When desirable, the addition of the second pre-emulsion mixture is started by ramping up the $2^{nd}$ variable flow rate while the $1^{st}$ variable flow rate is being ramped down such that the addition of the second pre-emulsion mixture is initiated prior to the addition of the first pre-emulsion mixture being completed. According to another aspect of the present disclosure (in FIG. 5B), the addition of the second pre-emulsion mixture may be started by ramping up the $2^{nd}$ variable flow rate 205 after the $1^{st}$ variable flow rate 200 is stopped, e.g., after the first pre-emulsion mixture has been completely added to the reactor vessel.

Further aspects of the invention include:

1. Hydrolysis resistant latex composite polymer particles for use in aqueous latex compositions or thermoplastics, the latex composite polymer particles comprising:

at least one first phase comprising a vinyl ester oligomer or polymer;

optionally, at least one intermediate phase configured between the first phase and a second phase; and at least one second phase comprising an acrylic oligomer or polymer, a styrene oligomer or polymer, an acrylic-styrene copolymer, an acrylic-stryene co-oligomer, or mixtures thereof, the intermediate and/or the second phase having a thickness of least 5 nm and at least partially encapsulating the first phase;

wherein, optionally, one or more of the first phase, the intermediate phase, and the second phase comprises a cross-linking agent, such that the first phase, the intermediate phase, or the second phase is at least partially cross-linked;

whereby the second phase and the intermediate phase, when present, is at least as hydrophobic, or preferably more hydrophobic than the first phase.

2. The composite polymer particles according to Claim 1 wherein the vinyl ester oligomer or polymer comprises functionality selected from the group consisting of vinyl acetate, vinyl propionate, vinyl butyrates, vinyl benzoate, and vinyl pivalate.

3. The composite polymer particles according to any of Claim 1 or 2 wherein the first phase further comprises copolymers of acrylate and (meth)acrylate functionality, phosphorous containing (meth)acrylate functionality, acid-containing functionality, phosphorous-containing acid functionality, or a mixture thereof.

4. The composite polymer particles according to any of Claims 1-3, wherein the combined weight ratio of the intermediate and second phase to the first phase is between about 1:10 to about 20:1.

5. The composite polymer particles according to any of Claims 1-4, wherein the intermediate phase comprises co-polymers having aliphatic or aromatic functionality along with acrylate or acrylic functionality.

6. The composite polymer particles according to Claim 5, wherein the intermediate phase comprises polymers having methyl methacrylate and/or butyl acrylate functionality.

7. The composite polymer particles according to any of Claims 1-6 wherein the composite polymer particles exhibit an occluded particle configuration or a core-shell particle configuration, wherein the core-shell particle configuration comprises:

the first phase having at least one inner polymeric core, the intermediate phase, when present, having at least one intermediate layer configured between the inner core and the second phase; and the second phase having at least one outer shell layer, the intermediate and/or shell layers at least partially encapsulating the inner polymer core;

wherein, optionally, one or more of the polymeric core, the intermediate layer, and the shell layer comprises a cross-linking agent, such that the polymer core, the intermediate layer, or the shell layer is at least partially cross-linked;

whereby the shell layer and the intermediate layer, when present, is more hydrophobic than the polymeric core.

8. The composite polymer particles according to any of Claims 1-7, wherein the core-shell particles have an average particle size between about 50 nanometers and about 500 nanometers and the outer shell has a thickness of between about 5-100 nanometers, and preferably between 15-100 nanometers, as measured using TEM.

9. The composite polymer particles according to any of Claims 1-8, wherein the optional cross-linking agent in the first phase, the second phase, or the intermediate phase is selected from the group consisting of divinyl benzene, bis methylene acrylamide, divinyl adipate, ally methacrylate (AMA), and ethylene glycol dimethacrylate (EGDMA).

10. The composite polymer particles according to any of Claims 1-9, wherein the particles are used in a powder application, or in a coating, paint, adhesive, sealant, caulk, thermoplastic, or ink.

11. A latex composition comprising a plurality of the latex composite polymer particles of any of Claims 1-10 dispersed in an aqueous medium;

wherein the latex composition comprises up to about 65 wt. % of the latex composite polymer particles based on the overall weight of the latex.

12. The latex composition according to Claim 11, wherein the latex composition forms a coating, paint, adhesive, sealant, caulk, thermoplastic, or ink that is water or hydrolysis resistant.

wherein the latex composition further comprises one or more additives selected from the group of additional polymers, pigments or colorants, fillers, dispersants or surfactants, coalescent agents, pH neutralizing agents, plasticizers, defoamers, thickeners, biocides, co-solvents, rheology modifiers, wetting or spreading agents, leveling agents, conductive additives, adhesion promoters, anti-blocking agents, anti-cratering agents or anti-crawling agents, anti-freezing agents, corrosion inhibitors, anti-static agents, flame retardants, optical brighteners, UV absorbers or other light stabilizers, chelating agents, crosslinking agents, flattening agents, flocculants, humectants, insecticides, lubricants, odorants, oils, waxes or anti-slip aids, soil repellants, and stain resistant agents.

13. A method of forming hydrolysis resistant composite polymer particles for use in aqueous latex compositions, the method comprising:

providing or forming at least one polymeric first phase; the polymeric first phase comprising a vinyl acetate oligomer, homopolymer or copolymer, and optionally, a cross-linking agent;

forming at least one of an intermediate phase configured between the first phase and an second phase; said second phase comprising acrylic oligomer or polymer, styrene oligomer or polymer, acrylic-styrene copolymers, or mixtures thereof;

the intermediate and/or second phases at least partially encapsulating the first phase; the intermediate phase and the second phase, optionally, comprising a cross-linking agent; and collecting the composite polymer particles;

whereby the second phase and the intermediate phase, when present, is more hydrophobic than the first phase;

wherein, optionally, at least one of the first phase, the intermediate phase, and the second phase are at least partially cross-linked.

14. The method of claim 13 wherein the hydrolysis resistant composite polymer particles formed have an occluded particle configuration or a core shell configuration wherein the core-shell configuration comprises:

the first phase is at least one inner polymeric core, the intermediate phase is at least one intermediate layer configured between the inner polymer core and the second phase; and the second phase is at least one outer shell layer, the intermediate and/or shell layers at least partially encapsulate the inner polymer core;

wherein, optionally, one or more of the polymeric core, the intermediate layer, and the shell layer comprises a cross-linking agent, such that the polymer core, the intermediate layer, or the shell layer is at least partially cross-linked;

whereby the shell layer and the intermediate layer when present, is more hydrophobic than the polymeric core.

15. The method according to any of Claim 13 or 14, wherein the first phase exhibits a glass transition temperature ($T_g$) and the forming of the intermediate phase and/or second phase is performed at a reaction temperature, such that the $T_g$ of the first phase is equal to or lower than the reaction temperature.

16. The method according to any of Claims 13-15, wherein the intermediate phase, when present, comprises monomers or polymers having aliphatic or aromatic functionality along with acrylate or acrylic functionality.

17. The method according to Claim 16, wherein the intermediate phase comprises polymers of methyl methacrylate and/or butyl acrylate.

The following specific examples are given to illustrate the latex composite polymer particles, as well as the latex compositions formed therefrom and methods of preparing the same, and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

Basic Characterization Methods of the Examples

The particle size of the latex composite polymer particles is determined using a dynamic light scattering (DLS) technique capable of measuring sizes that range from about 0.8 nanometers to 6,500 nanometers. Additional particle size characterization is performed using microscopic techniques, including conventional transmission electron microscopy (TEM) and scanning electron microscopy equipped with a cryogenic system (cryo-SEM).

Latex particle internal morphology is characterized using transmission electron microscopy (TEM) with cross-sectioning of the specimens. Each specimen is prepared using an ultra-microtoming procedure followed by staining with $RuO_4$ vapor, when necessary or desirable.

The glass transition temperature ($T_g$) for the layered polymer particles is determined using differential scanning calorimetry (DSC).

The level of hydrolysis is characterized using nuclear magnetic resonance (NMR) spectroscopy. Accelerated hydrolysis test is conducted by placing samples in a convective oven at 50° C. for a predetermined period of time combined with continual or constant measurement and recording of the pH value change.

Example 1—Preparation of Composite Polymer Particles (3 Phases)

This example demonstrates the formation of composite polymer particles according to the teachings of the present disclosure in which the first phase is provided as commercially available latex particles. A total of 184.5 g of vinyl acetate latex (Encor® 357, Arkema Inc.) is added to a reactor vessel that contains about 525 g of water. The temperature of the reactor vessel is adjusted between 76-79° C.

The addition of a pre-emulsion mixture comprising the components that will form the intermediate phase is then initiated. This intermediate phase pre-emulsion mixture includes 157.5 g of methyl methacrylate, 52.5 g butyl acrylate dispersed in 87.5 g of water with about 8.75 g of ethylene glycol dimethacrylate (EGDMA) as a cross-linking agent and about 5 g of sodium dodecylbenzene sulfonate as an emulsifier. The intermediate phase pre-emulsion mixture is added at a flow rate of about 2.5 g/min over a period of 120 minutes. Once the intermediate phase pre-emulsion mixture has been added, the mixture in the reactor vessel is stirred for about 10 minutes and the temperature is raised to be between 84-86° C.

The addition of the pre-emulsion mixture of the components that will form the second phase is then initiated. This second phase pre-emulsion mixture includes 182 g of methyl methacrylate, 164.5 g butyl acrylate, and 3.5 g acrylic acid dispersed in 87.5 g of water with about 10.5 g of sodium dodecylbenzene sulfonate as an emulsifier. The second phase pre-emulsion mixture is added at a flow rate of about 5 g/min over a period of 90 minutes. Once the second phase pre-emulsion mixture has been added, the mixture in the reactor vessel is stirred for about 10 minutes.

Then a total of about 1.75 g of sodium metabisulfate dispersed in about 35 g of water is added to the reactor vessel over a period of 30 minutes at a flow rate of 1.23 g/min. At the same time, a total of about 1.75 g of tert-butyl hydroperoxide (t-BHP) dispersed in 35 g of water is co-fed into the reactor vessel at the same flow rate. Once the oxidation reaction is complete the reactor vessel is cooled to room temperature and the layered polymer particles are collected, stored, analyzed, and used to form latex product compositions as previously described above.

Example 2—Preparation of First Phase (100% VA)

This example further demonstrates the formation of latex composite polymer particles according to the teachings of the present disclosure in which the first phase are first formed in a reactor vessel. In this example, the first phase is formed to comprise 100% vinyl acetate (VA).

The reactor vessel is initially charged with a soap solution comprising 1.9 g of sodium bicarbonate and 13.4 g of sodium dodecylbenzene sulfonate dispersed in 579.1 g of deionized (DI) water and heated to a temperature of about 74° C. The reactor vessel is then charged with 14.3 g of vinyl ester monomer stabilized with hydroquinone (HQ). The temperature of the reactor vessel is adjusted to maintain a temperature of 74° C. An oxidizer solution comprising 0.3 g sodium persulfate in 17.8 g of DI water and a reducer solution comprising 0.3 g of sodium metabisulfite in 17.8 g of DI water is added to the reactor vessel. The resulting mixture is allowed to react and exotherm over a 20 minute period.

A monomer mixture and a feed oxidizer solution are continuously fed into the reactor vessel over a period of about 3 hours and 3.5 hours, respectively. The total amount of the monomer mixture that is fed into the reactor comprises 534.6 g vinyl acetate HQ monomer, 26.7 g divinyl adipate, and 28.5 g sodium dodecylbenzene sulfonate in 178.2 g of DI water. The feed oxidizer solution that is fed into the reactor comprises 1.3 g sodium persulfate in 44.6 g of DI water. The temperature of the reactor is maintained at 74° C.

After the monomer mixture and the feed oxidizer solution has been added to the reactor vessel, the feed line used to add the monomer mixture is rinsed with 17.8 g of DI water. Then a post oxidizer solution and a post reducer solution are simultaneously fed into the reactor over a period of 45 minutes. The post oxidizer solution comprises 0.5 g t-butyl hydroperoxide in 10.7 g of DI water. The post reducer solution comprises 0.5 g sodium metabisulfite in 11.9 g DI water. The reactor vessel is allowed to continue reacting for an additional 30 minutes at a temperature of 74° C. Then the reactor vessel is cooled to 40° C. and the VA polymers (e.g., solids) present in the reactor vessel are collected and either stored or used in forming the composite polymer particles as further described in Example 4 below.

Example 3—Preparation of First Phase (80%/20% VA/BA)

This example further demonstrates the formation of latex composite polymer particles according to the teachings of the present disclosure in which the first phase are first formed in a reactor vessel. In this example, the first phase is formed to comprise 80 wt. % vinyl acetate (VA) and 20 wt. % butyl acetate.

The reactor vessel is initially charged with a soap solution comprising 2.7 g of sodium bicarbonate and 16.3 g of sodium dodecylbenzene sulfonate dispersed in 488.7 g of deionized (DI) water and heated to a temperature of about 74° C. The reactor vessel is then charged with 43.4 g of vinyl ester monomer stabilized with hydroquinone (HQ). The temperature of the reactor vessel is adjusted to maintain a temperature of 74° C. An oxidizer solution comprising 1.1 g t-butyl hydroperoxide in 21.7 g of DI water and a reducer solution comprising 1.1 g of sodium metabisulfite in 21.7 g of DI water is added to the reactor vessel. The resulting mixture is allowed to react and exotherm over a 15 minute period.

A monomer mixture is continuously fed to the reactor vessel over a period of 3 hours. Similarly, both feed oxidizer and reducer solutions are continuously fed into the reactor vessel over a period of about 3.5 hours. The total amount of the monomer mixture that is fed into the reactor comprises 521.3 g vinyl acetate HQ stabilized monomer, 32.6 g divinyl adipate, 130.3 g butyl acrylate MEHQ monomer, and 34.8 g sodium dodecylbenzene sulfonate in 217.2 g of DI water. After the monomer mixture has been added to the reactor vessel, the feed line used to add the monomer mixture is rinsed with 108.6 g of DI water.

The feed oxidizer solution that is fed into the reactor comprises 10.9 g t-butyl hydroperoxide in 108.6 g of DI water. The feed reducer solution that is fed into the reactor comprises 10.9 g sodium metabisulfite in 108.6 g of DI water. The temperature of the reactor is maintained at 74° C. until after the feed oxidizer and reducer solutions have been added. The reactor vessel is cooled to 40° C. and the 80/20 VA/BA polymers (e.g., solids) present in the reactor vessel are collected and either stored or used in forming the latex composite particles as further described Example 4 below.

Example 4—Preparation of Composite Polymer Particles (3 Phases)

This example further demonstrates the formation of latex composite polymer particles according to the teachings of the present disclosure in which the first phase is first formed in a reactor vessel. A reactor vessel containing 450 g DI water is charged by the addition of 1.4 g ammonium persulfate and 0.2 g sodium bicarbonate dissolved in 67.5 g DI water. The reaction vessel is heated to about 80-82° C. A total of 245.3 g of the first phase previously formed above in either Example 2 or Example 3 is added to the reactor vessel. The temperature of the reactor vessel is adjusted between 76-79° C.

The addition of a pre-emulsion mixture comprising the components that will form the intermediate phase is then initiated. This intermediate phase pre-emulsion mixture includes 81.0 g of methyl methacrylate, 27.0 g butyl acrylate dispersed in 54.0 g of DI water with 3.6 g of sodium dodecylbenzene sulfonate as an emulsifier. The intermediate phase pre-emulsion mixture is added at a flow rate of about 1.2 g/min over a period of 140 minutes. Once the intermediate phase pre-emulsion mixture has been added, the mixture in the reactor vessel is stirred for about 10 minutes. Then 0.68 g ammonium persulfate dissolved in 36.0 g DI water is added and the temperature is raised to be between 84-86° C.

The addition of a pre-emulsion mixture comprising the components that will form the second phase is then initiated. This second phase pre-emulsion mixture includes 495.0 g of styrene, 22.5 g methacrylic acid, and 5.4 g divinylbenzene (DVB) dispersed in 112.5 g of DI water with about 9.0 g of sodium dodecylbenzene sulfonate as an emulsifier. The second phase pre-emulsion mixture is added at a flow rate of about 7.2 g/min over a period of 90 minutes. Once the second phase pre-emulsion mixture has been added, the mixture in the reactor vessel is stirred for about 10 minutes.

Then a total of about 1.8 g of sodium metabisulfate dispersed in about 35 g of water is added to the reactor vessel over a period of 30 minutes at a flow rate of 1.26 g/min. At the same time, a total of about 1.8 g of tert-butyl hydroperoxide (t-BHP) dispersed in 35 g of water is co-fed into the reactor vessel at the same flow rate. Once the oxidation reaction is complete the reactor vessel is cooled to room temperature and the latex composite polymer particles are collected, stored, analyzed, and used to form latex compositions as previously described above.

Example 5—Preparation of Composite Polymer Particles (2 Phases)

This example further demonstrates the formation of latex composite polymer particles according to the teachings of the present disclosure. In this example, the first phase is formed in a first reactor vessel according to the procedure set forth in Example 2.

A $2^{nd}$ reactor vessel containing 350.0 g DI water is charged by the addition of 1.1 g ammonium persulfate and 0.2 g sodium bicarbonate dissolved in 52.5 g DI water. The reaction vessel is heated to about 72° C. A total of 190.8 g of the vinyl acetate first phase previously formed above is added to the $2^{nd}$ reactor vessel. The temperature of the $2^{nd}$ reactor vessel is adjusted between 68-70° C.

The addition of a pre-emulsion mixture comprising the components that will form the intermediate phase is then initiated. This intermediate phase pre-emulsion mixture includes 245.0 g of methyl methacrylate, 175.0 g butyl acrylate dispersed in 175.0 g of DI water with 10.5 g of sodium dodecylbenzene sulfonate as an emulsifier. The intermediate phase pre-emulsion mixture is added at a flow rate of about 2.5 g/min over a period of 240 minutes. Once the intermediate phase pre-emulsion mixture has been added, the mixture in the reactor vessel is stirred for about 10 minutes.

Then a total of about 1.8 g of sodium metabisulfate dispersed in about 36 g of water is added to the reactor vessel over a period of 30 minutes at a flow rate of 1.26 g/min. At the same time, a total of about 1.8 g of tert-butyl hydroperoxide (t-BHP) dispersed in 36 g of water is co-fed into the reactor vessel at the same flow rate. Once the oxidation reaction is complete the reactor vessel is cooled to room temperature and the latex composite polymer particles are collected, stored, analyzed, and used to form latex product compositions as previously described above.

Example 6—Comparison of pH Stability for Composite Polymer Particles

The hydrolytic stability of latex composite polymer particles as formulated above in Examples 1-3, as well as additional composite particles formulated according to the teachings of the present disclosure are compared against commercially available vinyl products. The latex composite polymer particles of the present disclosure and the comparable vinyl products are subjected to an accelerated hydrolysis test in which the samples are placed into a convective oven at 50° C. with the pH being measured over a period of 50 days.

The pH of all samples is found to decrease from their initial value over the 50 day period of time. However, the pH of the composite particles decreases only by about 0.25 pH units to 0.9 pH units over the 50 day period, while the pH of the comparable vinyl products decreases by greater than 1.25 pH units over the same time period. In addition, the pH of the comparable vinyl products decreases by about 0.6 pH units after only 5 days of exposure to the test environment, while the latex composite polymer particles of the present disclosure exhibit a pH decrease in the range of about 0.1 to 0.3 pH units over that same 5 day time period. This example demonstrates that the composite polymer particles of the present disclosure are capable of resisting high pH hydrolysis to a substantially greater degree than comparable particles that are commercially available.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. Hydrolysis resistant latex composite polymer particles for use in aqueous latex compositions or thermoplastics, the latex composite polymer particles comprising:
   at least one phase comprising a vinyl ester oligomer or polymer;
   at least one intermediate phase configured between the first phase and a second phase, wherein the intermediate phase comprises co-polymers having aliphatic or aromatic functionality along with acrylate or acrylic functionality or polymers having methyl methacrylate and/or butyl acrylate functionality; and
   at least one second phase comprising an acrylic oligomer or polymer, a styrene oligomer or polymer, an acrylic-styrene copolymer, or mixtures thereof,
   the intermediate phase and/or the second phase at least partially encapsulating the first phase;
   wherein, optionally, one or more of the first phase, the intermediate phase, and the second phase comprises a cross-linking agent, such that the first phase, the intermediate phase, or the second phase is at least partially cross-linked;
   whereby the second phase and the intermediate phase are more hydrophobic than the first phase, and
   wherein the combined weight ratio of the intermediate phase and second phase to the first phase is between about 1:10 to about 20:1.

2. The composite polymer particles according to claim 1 wherein the vinyl ester oligomer or polymer comprises functionality selected from the group consisting of vinyl acetate, vinyl propionate, vinyl butyrates, vinyl benzoate, and vinyl pivalate.

3. The composite polymer particles according to claim 2 wherein the vinyl ester oligomer or polymer comprises vinyl acetate functionality.

4. The composite polymer particles according to claim 1 wherein the first phase further comprises copolymers of acrylate and (meth)acrylate functionality, phosphorous containing (meth)acrylate functionality, acid-containing functionality, phosphorous-containing acid functionality, or a mixture thereof.

5. The composite polymer particles according to claim 1, wherein the optional cross-linking agent in the first phase, the second phase, or the intermediate phase is selected from the group consisting of divinyl adipate, ally methacrylate (AMA), and ethylene glycol dimethacrylate (EGDMA).

6. The composite polymer particles according to claim 1, wherein one or more of the first phase, the intermediate phase-, and the second phase is at least partially cross-linked.

7. The composite polymer particles according to claim 1, wherein the composite polymer particles have an occluded particle configuration or a core-shell particle configuration, wherein the core-shell particle configuration comprises:
the first phase having at least one inner polymeric core,
the intermediate phase having at least one intermediate layer configured between the inner core and the second phase; and
the second phase having at least one outer shell layer,
the intermediate and/or shell layers at least partially encapsulating the inner polymer core;
wherein, optionally, one or more of the polymeric core, the intermediate layer, and the shell layer comprises a cross-linking agent, such that the polymer core, the intermediate layer, or the shell layer is at least partially cross-linked;
whereby the shell layer and the intermediate layer are more hydrophobic than the polymeric core.

8. The composite polymer particles according to claim 7, wherein the core-shell particles have an average particle size between about 50 nanometers and about 500 nanometers and the outer shell has a thickness of between about 15-100 nm as measured using TEM.

9. The composite polymer particles according to claim 1, wherein the composite polymer particles are used in a coating, paint, adhesive, sealant, caulk, thermoplastic, or ink.

10. The composite polymer particles according to claim 1, wherein the composite polymer particles are used in a powder application.

11. A latex composition comprising a plurality of the latex composite polymer particles of claim 1 dispersed in an aqueous medium.

12. The latex composition according to claim 11, wherein the latex composition comprises from about 1 wt. % up to about 65 wt. % of the latex composite polymer particles based on the overall weight of the latex composition.

13. The latex composition according to claim 11, wherein the latex composition forms a coating, paint, adhesive, sealant, caulk, thermoplastic, or ink that is water or hydrolysis resistant.

14. The latex composition according to claim 11, wherein the latex composition further comprises one or more additives selected from the group of additional polymers, pigments or colorants, fillers, dispersants or surfactants, coalescent agents, pH neutralizing agents, plasticizers, defoamers, thickeners, biocides, co-solvents, rheology modifiers, wetting or spreading agents, leveling agents, conductive additives, adhesion promoters, anti-blocking agents, anti-cratering agents or anti-crawling agents, antifreezing agents, corrosion inhibitors, anti-static agents, flame retardants, optical brighteners, UV absorbers or other light stabilizers, chelating agents, crosslinking agents, flattening agents, flocculants, humectants, insecticides, lubricants, odorants, oils, waxes or anti-slip aids, soil repellants, and stain resistant agents.

15. A method of forming hydrolysis resistant composite polymer particles for use in aqueous latex composition, the method comprising:
providing or forming at least one polymeric first phase; the polymeric first phase comprising a vinyl acetate oligomer, homopolymer or copolymer, and optionally, a cross-linking agent;
forming at least one of an intermediate phase configured between the first phase and a second phase; the intermediate phase comprises co-polymers having aliphatic or aromatic functionality along with acrylate or acrylic functionality or polymers having methyl methacrylate and/or butyl acrylate functionality;
said second phase comprising acrylic oligomer or polymer, styrene oligomer or polymer, acrylic-styrene copolymers, or mixtures thereof;
the intermediate and/or second phases at least partially encapsulating the first phase; the intermediate phase and the second phase, optionally, comprising a cross-linking agent; and
collecting composite polymer particles;
whereby the second phase and the intermediate phase is more hydrophobic than the first phase and
wherein the combined weight ratio of the intermediate phase and second phase to the first phase is between about 1:10 to about 20:1.

16. The method of claim 15 wherein the hydrolysis resistant composite polymer particles formed have an occluded particle configuration or a core shell configuration wherein the core-shell configuration comprises:
the first phase is at least one inner polymeric core,
the intermediate phase is at least one intermediate layer configured between the inner polymer core and the second phase; and
the second phase is at least one outer shell layer,
the intermediate and/or shell layers at least partially encapsulate the inner polymer core;
wherein, optionally, one or more of the polymeric core, the intermediate layer, and the shell layer comprises a cross-linking agent, such that the polymer core, the intermediate layer, or the shell layer is at least partially cross-linked;
whereby the shell layer and the intermediate layer is more hydrophobic than the polymeric core.

17. The method according to claim 15, wherein the method further comprises at least partially cross-linking at least one of the first phase, the intermediate phase, and the second phase.

18. The method according to claim 15, wherein the first phase exhibits a glass transition temperature ($T_g$) and the forming of the intermediate phase and/or second phase is performed at a reaction temperature, such that the $T_g$ of the first phase is equal to or lower than the reaction temperature.

* * * * *